Figure 1:
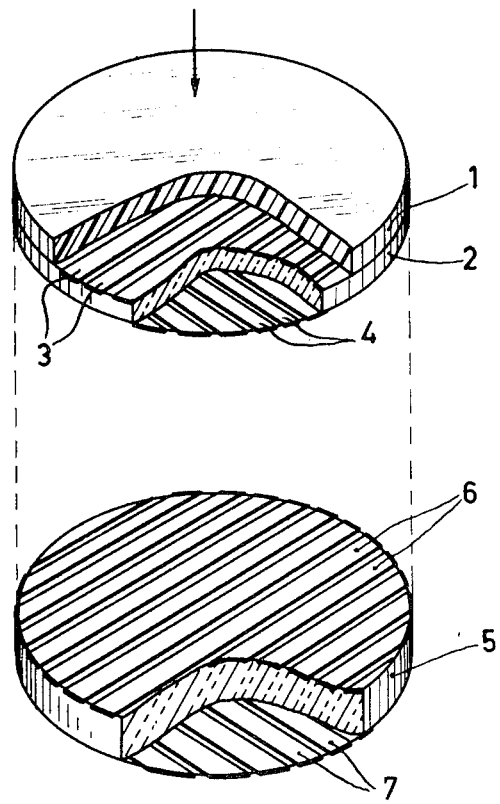

United States Patent

[11] 3,581,091

| [72] | Inventor | Albertus Cornelis Meijer<br>Emmasingel, Eindhoven, Netherlands |
|---|---|---|
| [21] | Appl. No. | 756,751 |
| [22] | Filed | Sept. 3, 1968 |
| [45] | Patented | May 25, 1971 |
| [73] | Assignee | U.S. Philips Corporation<br>New York, N.Y. |
| [32] | Priority | Sept. 15, 1968 |
| [33] | | Netherlands |
| [31] | | 6712684 |

[54] NEUTRON SPECTROMETER EMPLOYING TWO SEMICONDUCTOR COUNTERS IN COMBINATION WITH A COINCIDENCE CIRCUIT FOR ELIMINATING BACKGROUND
2 Claims, 2 Drawing Figs.

[52] U.S. Cl. .................................................. 250/83.1, 250/83.3
[51] Int. Cl. .................................................. G01t 3/00
[50] Field of Search ........................................ 250/83.1, 83.3

[56]       References Cited
       UNITED STATES PATENTS

| 3,207,902 | 9/1965 | Sandborg ..................... | 250/83.3 |
| 3,359,421 | 12/1967 | Perez-Mendez et al. ...... | 250/83.1X |
| 3,415,992 | 12/1968 | Webb .......................... | 250/83.3X |

Primary Examiner—William F. Lindquist
Assistant Examiner—Davis L. Willis
Attorney—Frank R. Trifari ABSTRACT: A hydrogen rich foil is arranged at right angles to a beam of neutrons to be measured and emits protons which are interrupted and counted by a semiconductor barrier layer transmission counter ($dE/dx$—counter) and a semiconductor absorption or output counter ($E$—counter which count the protons and measure the energy, background being eliminated by a coincidence counter. Both the transmission counter and absorption counter consists of a checkerboard counter and the scattering foil is arranged substantially immediately against the transmission counter, the scattered protons being measured by means of the coincidence circuit not only according to their number and energy, but also according to their direction.

PATENTED MAY 25 1971　　　　　　　　　　　　　　3,581,091

INVENTOR.
ALBERTUS C. MEIJER

BY Frank R. Trifari

AGENT

NEUTRON SPECTROMETER EMPLOYING TWO SEMICONDUCTOR COUNTERS IN COMBINATION WITH A COINCIDENCE CIRCUIT FOR ELIMINATING BACKGROUND

The invention relates to a neutron spectrometer in which a foil of a material which is rich in hydrogen and which emits scattered protons upon being bombarded with neutrons, is arranged at right angles to the beam to be measured, while behind and parallel to it successively a semiconductor barrier layer transmission counter ($dE/dx$-counter) and a semiconductor barrier layer absorption or output counter ($E$-counter) are arranged which count the protons and measure the energy, the background being eliminated by means of a coincidence circuit.

In the known arrangement, a neutron telescope, according to the above described principle, the distance between the scattering foil and the first counter and that between the two counters likewise is approximately equal to the diameter of the counters and a number of tantalum foils are used for limiting the proton beam. Typical values for the diameter of the counters are 1 to 2 cm. In order to obtain a reasonable energy-separating power, the distance from the output counter to the scattering foil may not be too small. For example, for neutrons of 5 Mev., the separating power is only 7percent in an arrangement having a specific sensitivity of $2.5 \times 10^{15}$ (countings/neutrons/cm$^2$=(t.m.$^{11}$cm$^{12}$). For a separating power of 5 percent this is $1 \times 10^{15}$ counting/neutrons/cm$^2$. The energy separating power is here defined as the half width, that is the width at half of the peak of the monoenergetic neutron group.

It is also known to provide two semiconductor detectors beside each other on a single plate of silicon and coating one of them with a proton scattering foil. The background as a result of reactions of neutrons or other particles with the semiconductor itself is eliminated by statistical comparison of the spectra obtained with the two detectors.

For neutron energies of 5 Mev., said background is approximately equally as high as the spectrum of the scattered protons, so that said comparison yields very inaccurate results. The specific sensitivity is $10^{14}$ countings/neutrons/cm$^2$. The separating power is hard to define.

For the accurate measurements of the angle divisions in a beam of charged particles, an arrangement is known which employs a counter telescope in which the transmission counter consists of a so-called checker-board counter. The electrodes on the front and rear sides are subdivided in narrow bands, those of the front and rear sides intersecting each other at right angles. In this manner an accurate determination of the place of the incoming charged particle is possible. By means of the output counter the energy of the particles can be measured.

It is the object of the invention to provide a neutron spectrometer which makes more accurate determinations possible.

According to the invention, in a neutron spectrometer in which a foil of a material which is rich in hydrogen and which emits scattered protons upon being bombarded with neutrons is arranged at right angles to the beam to be measured, while behind and parallel to it successively a semiconductor barrier layer transmission counter ($dE/dx$-counter) and a semiconductor barrier layer absorption counter or output counter ($E$-counter) are arranged which count the protons and measure the energy, the background being eliminated by means of a coincidence circuit, both the transmission counter and the absorption counter consist of a check board counter as disclosed and claimed in application Ser. No. 619,465, filed Feb. 28, 1967 and the scattering foil is arranged substantially immediately against the transmission counter, the scattered protons being measured by means of the coincidence circuit not only according to their number and energy, but also according to their direction.

The arrangement of the two checkerboard counters provides the possibility of measuring the direction of a proton traversing the two counters. Because for the protons scattered by neutrons with energy $E_n$ at an angle $\alpha$ with the direction of movement of neutrons and an energy $E_p$ it holds that $E_p = E_n \cos^2\alpha$, the energy of the original neutrons may also be derived from the resulting data.

The elimination of the background is as favourable as in the known neutron telescope. The sensitivity with the same separating power as of the neutron telescope already known, is considerably greater.

Figure 2:
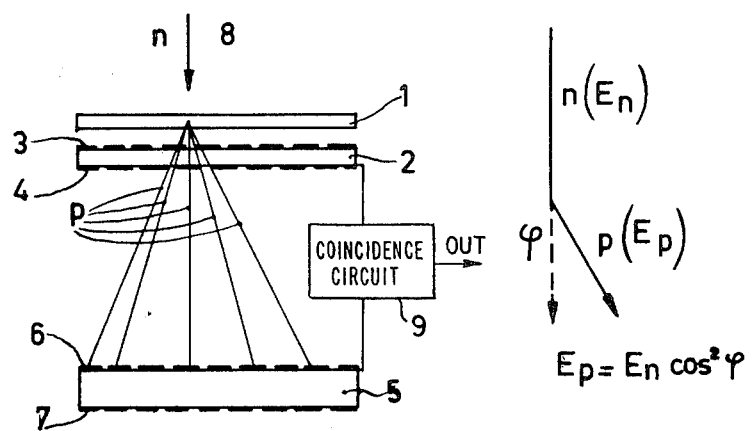

In order that the invention may be readily carried into effect, it will now be described in greater detail, by way of example with reference to the accompanying diagrammatic drawing, in which FIG. 1 is a diagrammatic perspective view of the essential elements of a neutron spectrometer according to the invention and FIG. 2 is a cross-sectional view of the device explaining its operation.

Referring now to FIG. 1 in which the settings and the electrode supply wires are not shown, reference numeral 1 denotes a polyethelene foil, thickness 10 microns 2 is a silicon barrier layer counter. The thickness of 2 is 30 microns the diameter 20 mm. On the upper side of the disc, a number of electrode strips 3 of gold are vapor-deposited, thickness 0.3 micron, distance mutually 100 microns. On the lower side strips 4 of aluminum are provided so as to intersect the strips 3 at right angles.

At a distance of 20 mm. below the disc 2, the disc 5, thickness 1.5 mm., is arranged which likewise consists of silicon having at its upper side electrodes 6 of gold and at its lower side electrodes 7 of aluminum. The direction of a neutron beam is denoted by 8.

It may be seen from FIG. 2 that the protons which are formed in 1 by the neutron beam 8 are scattered in all directions, the relation of the energy of the protons to that of the neutrons being given by formula $E_p = E_n \cos^2\alpha$ stated beside it. $E_n$ can be calculated by determining $E_p$ and $\alpha$ from the coincidence circuits 9 and the $E$-counter ($\alpha$ follows from the electrode pairs 3,4 and 6,7 included in the coincidence.

I claim:

1. A neutron spectrometer comprising a foil of a material which is rich in hydrogen and which emits scattered protons being bombarded with neutrons arranged at right angles to the beam to be measured, a semiconductor barrier layer transmission counter ($dE/dx$-counter) and a semiconductor barrier layer absorption counter or output counter ($E$-counter) arranged successively behind and parallel to the foil which count the protons and measure the energy, a coincidence circuit connected to said counters for eliminating background, both said transmission counter and said absorption counter consisting of a checkerboard counter and the scattering foil being arranged substantially immediately against the transmission counter, the scattered protons being measured by means of the coincidence circuit not only according to their number and energy but also according to their direction.

2. A neutron spectrometer as claimed in claim 1, wherein the scattering foil consists of polyethylene having a thickness of 10 microns, the transmission counter of silicon has a thickness of 30 microns and the output counter of the same material has a thickness of 1.5 mm. at the distance of 20 mm. from the transmission counter, the diameter of the foil and counters being 20 mm.

UNITED STATES PATENT OFFICE
CERTIFICATE OF CORRECTION

Patent No. 3,581,091              Dated May 25, 1971

Inventor(s) ALBERTUS CORNELIS MEIJER

It is certified that error appears in the above-identified patent and that said Letters Patent are hereby corrected as shown below:

Column 1, line 26, "$2.5 \times 10^{15}$" should be -- $2.5 \times 10^{-5}$ --;
line 27, "$(t.m^{11} cm^{12})$" should be --$(t.m^{+1} cm^{+2})$--;
line 41, "$10^{14}$" should be --$10^{-4}$--;

Column 2, line 8, "Ep=Enj" should be --Ep=En--.

Signed and sealed this 8th day of February 1972.

(SEAL)
Attest:

EDWARD M. FLETCHER, JR.          ROBERT GOTTSCHALK
Attesting Officer                Commissioner of Patents

UNITED STATES PATENT OFFICE
CERTIFICATE OF CORRECTION

Patent No. 3,581,091          Dated May 25, 1971

Inventor(s) ALBERTUS CORNELIS MEIJER

It is certified that error appears in the above-identified patent and that said Letters Patent are hereby corrected as shown below:

Column 1, change the priority date from "September 15, 1968" --September 15, 1967--

Signed and sealed this 16 day of May 1972.

(SEAL)
Attest:

EDWARD M. FLETCHER, JR.      ROBERT GOTTSCHALK
Attesting Officer             Commissioner of Patents